United States Patent

Andersson et al.

[11] Patent Number: 5,290,737
[45] Date of Patent: Mar. 1, 1994

[54] FIBER-REINFORCED METAL OR CERAMIC MATRICES

[75] Inventors: Clarence A. Andersson, Pittsburgh; Deborah P. Partlow, Edgewood Borough; Bulent E. Yoldas, Churchill Borough; Raymond J. Bratton, Delmont, all of Pa.

[73] Assignee: Westinghouse Electric Corp., Pittsburgh, Pa.

[21] Appl. No.: 757,718

[22] Filed: Jul. 22, 1985

[51] Int. Cl.$^5$ .................... B22F 9/16; C03C 13/00
[52] U.S. Cl. ........................... 501/35; 428/549; 428/546; 427/419.6
[58] Field of Search ............ 428/408, 570, 379, 403, 428/404, 688, 689, 698, 546, 549; 427/215, 443.2, 419.6; 501/35

[56] References Cited

U.S. PATENT DOCUMENTS

| | | | |
|---|---|---|---|
| 4,134,759 | 1/1979 | Yajima et al. | 428/608 |
| 4,293,593 | 10/1981 | Yoldas . | |
| 4,346,131 | 8/1982 | Yoldas . | |
| 4,346,324 | 8/1982 | Yoldas . | |
| 4,361,598 | 11/1982 | Yoldas . | |
| 4,376,803 | 3/1983 | Katzman | 428/902 |
| 4,569,886 | 2/1986 | Divecha et al. | 428/379 |

OTHER PUBLICATIONS

Yoldas-Deposition & Properties of Optical Oxide Coatings from Polymerized Solutions-Aug. 15, 1982-Applied Optics, vol. 21, p. 2960.
Yoldas-Effect of Variations in Polymerized Oxides on Sintering & Crystalline Transformations-Aug. 1982-J. of Am. Ceramic Soc., vol. 65, p. 387.

*Primary Examiner*—Donald P. Walsh
*Assistant Examiner*—John N. Greaves
*Attorney, Agent, or Firm*—D. Schron

[57] ABSTRACT

A composite material having a fiber system embedded in a host matrix material. The fiber system has a protective reaction barrier around the embedded fibers to prevent deleterious chemical or mechanical reaction between the fiber and matrix. The fiber coating is applied by immersion of the fiber system into an alkoxide solution of the desired oxide precursor with controlled immersion and withdrawal rates with subsequent drying, heating to convert to a pure oxide state, and where required, post processing, to convert the oxide coating to a carbide or nitride, for example.

15 Claims, 3 Drawing Sheets

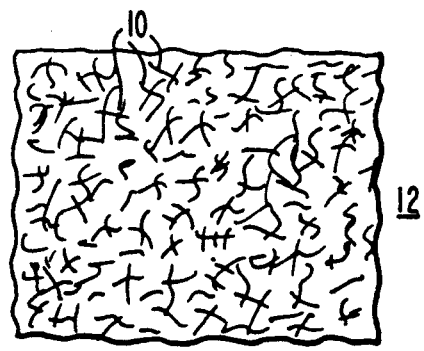
FIG. IA
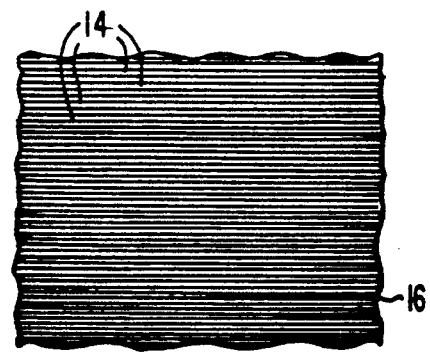
FIG. IB
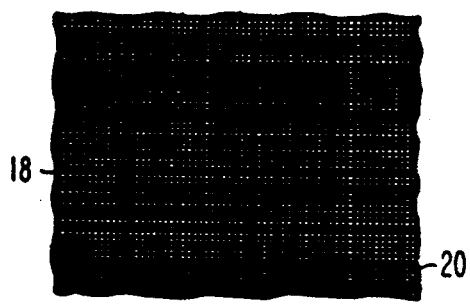
FIG. IC
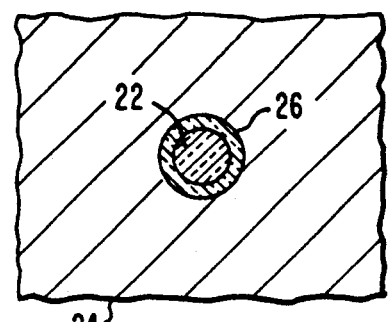
FIG. 2
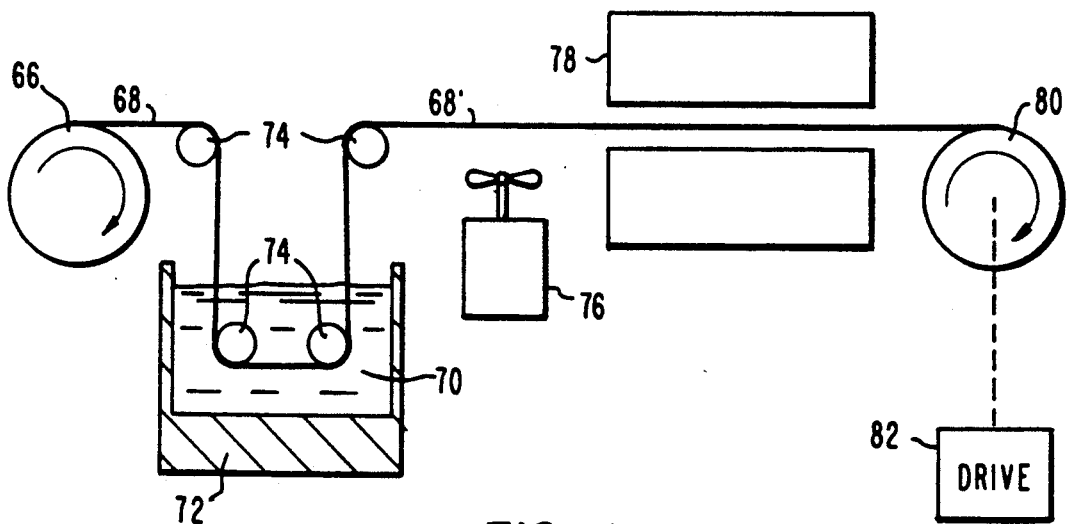
FIG. 4

FIBER-REINFORCED METAL OR CERAMIC MATRICES

STATEMENT OF GOVERNMENT INTEREST

The Government has rights in this invention pursuant to Contract No. F33615-83-C-5027 awarded by the Department of the Air Force.

BACKGROUND OF THE INVENTION

1. Field of the Invention

The invention in general relates to composite materials and particularly to an improved method for fabricating such materials.

2. Description of the Prior Art

A composite material, or structure, is one wherein a fiber system is embedded in a host material, also known as a matrix. The fiber system, which may be a woven cloth, individual parallel oriented or cross-plied fibers or randomly oriented short fibers or whiskers, by way of example, is introduced into the host material which is provided in liquid or powdered form. After combining, the mixture is subjected to further processing such as heat and/or pressure treatment resulting in the formation of a dense composite material.

The fibers, which are of high strength and stiffness, are utilized to reinforce the matrix which, in the case of metal matrices, results in increased creep and stress-rupture properties. In the case of ceramic matrices, the ceramic becomes less brittle, with greatly improved fracture toughness capabilities.

Such composite materials are used, and have potential uses in military as well as innumerable industrial applications such as in the building industry, chemical or other processing plants, air, surface and subsea vehicles, appliances, automotive parts, turbines and electrical components such as printed circuit boards, to name a few.

Various fiber-matrix combinations have resulted in composite materials which have failed to meet expectations, particularly in elevated temperature environments. The major cause of composite failure is an incompatibility between a particular fiber and a particular matrix, both from a chemical and mechanical standpoint. By way of example, at elevated operating temperatures, or at the temperatures needed to densify the material during fabrication of the composite, chemical reactions may occur between the fiber and the matrix which may actually corrode the surface of the fiber thereby reducing its strength by many orders or magnitude. In some cases, chemical reactions may also cause debonding between the fiber and matrix so as to prevent or inhibit the stress transfer mechanism which gives the composite its desired properties. In other cases, e.g., high toughness ceramic matrix/ceramic reinforced composites in which debonding is desirable, the chemical reactions may promote bonding. Problems also arise from a mismatch of thermal expansion coefficients between the fiber and host material.

To obviate these disadvantages, some composites are made by coating the fibers with an interface or barrier layer that is compatible with both the fiber and matrix so that the fiber properties are not degraded during processing or use. In addition, this barrier layer may be fabricated with a desired controlled expansion coefficient.

Presently, protective coatings, or barrier layers, are deposited on the fibers by techniques such as rf sputtering or vapor deposition. These processes, in addition to being relatively expensive, do not always uniformly coat the fibers such that uncoated or exposed portions will objectionably react with the host material.

Another method of barrier formation is by the addition of certain chemicals to the host material to hopefully react with the fiber to form a desired coating thereon. This technique requires ultra-precise control of the uniformity of the additives as well as precise control over processing temperature vs. time relationships.

In the composite material of the present invention, a protective barrier coating is formed on the fibers by a process which is simple, inexpensive and ensures for a controlled uniform coating on the fiber.

SUMMARY OF THE INVENTION

In accordance with the present invention, a fiber system to be embedded in a host material is first immersed into a polymerized solution of an oxide precursor, prepared by reaction of a metal alkoxide with water in a mutual solvent such as alcohol so as to coat the fiber system with the oxide precursor. After a predetermined time period to ensure for a particular coating, the fiber system is removed from the solution, at a controlled rate, and dried. Thereafter, the fiber system is heated to drive off any remaining organic components and to convert the coating to a pure oxide state after which it is introduced into the host matrix material which is then processed such as by sintering and/or not pressing to form a dense solid composite material. Other chemical species such as nitride or carbide coatings may be formed by further processing the oxide coating prior to introduction into the host material.

BRIEF DESCRIPTION OF THE DRAWINGS

FIGS. 1A to 1C illustrate various fiber systems in a host material;

FIG. 2 is a cross-sectional view of a single fiber, with coating, in a host material;

FIG. 4 is a view of apparatus for continuous coating; and

DESCRIPTION OF THE PREFERRED EMBODIMENTS

Figure 3:
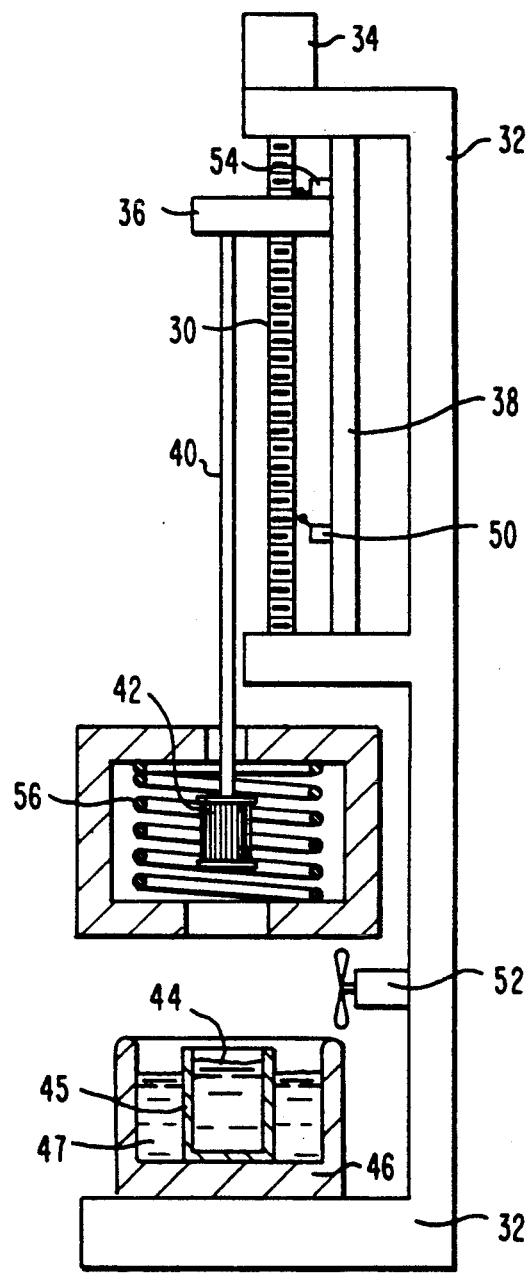
FIG. 3 is a view of apparatus for batch coating a fiber system.

FIGS. 1A through 1C illustrate various fiber systems embedded in a matrix forming a composite material. FIG. 1A illustrates the fibers as a plurality of randomly oriented fibers or whiskers 10 in a matrix 12; FIG. 1B illustrates fibers 14 unidirectionally aligned in a matrix 16; and FIG. 1C illustrates a fiber system in the form of a cross-plied or woven cloth 18 in a matrix 20. For some applications, the fibers are individual strands while for other applications a fiber yarn may be utilized.

FIG. 2 is a cross-sectional end view of a single fiber 22 in a matrix 24. A coating or barrier interface 26 completely surrounds the cylindrical wall of the fiber so as to eliminate any deleterious chemical or mechanical reaction between the fiber 22 and host material 24.

In accordance with the present invention, the fiber system is immersed into a polymerized solution of the barrier precursor prepared by reaction of a metal alkoxide with water in a mutual solvent such as alcohol so as to coat the fiber system with the oxide precursor. For the fabrication of some composites, the oxide coated fiber may be further treated so as to convert the oxide coating to a desired carbide or nitride coating, by way of example.

The formation of the metallic oxide coating on the fiber occurs through two simultaneous reactions of hydrolysis and polymerization, as follows:

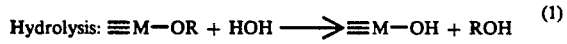

(1)

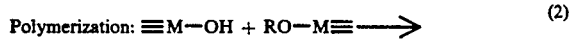

(2)

where:
- M is a metal(s)
- R is an alkyl group
- M—OR is a metal alkoxide(s); and
- M—O—M≡ is the polymerized precursor which converts to its oxide counterpart, $MO_V$, upon subsequent heating.

Metal alkoxides are well-known commercially available compounds of the general formula $M(OR)_V$ where M is a metal with valence V and R is an alkyl group of the general formula, $C_XH_{2X+1}$.

The above reactions for forming a metal oxide are well known and are described in such U.S. Pat. Nos. as 4,293,593 and 4,346,324 relating to a heat mirror coating on the interior of an incandescent lamp, and U.S. Pat. Nos. 4,346,131 and 4,361,598 relating to an optical oxide coating on a silicon solar cell. The process is also described in various published articles such as "Deposition and Properties of Optical Oxide Coatings from Polymerized Solutions"—*Applied Optics*, Volume 21, page 2960, Aug. 15, 1982 and "Effect of Variations in Polymerized Oxides on Sintering and Crystalline Transformations"—*Journal of the American Ceramics Society*, Volume 65, No. 8, August, 1982, by way of example.

As applied to the present invention, FIG. 3 illustrates, by way of example, a device for batch coating of a fiber system for preparation of a composite material. The apparatus of FIG. 3 includes a screw drive 30 mounted in a frame member 32 and rotatable therein by means of a drive mechanism 34. An internally threaded bracket 36 receives the screw drive and is vertically movable within a guide 38.

A rod 40 connected to bracket 36 carries at its opposed end the fiber system 42 to be coated by immersion in an alkoxide solution 44 within container 45. If the fibers are in bundle form, stirring and/or agitation of the alkoxide solution may be desirable to help promote penetration of the solution and to eliminate air pockets. Agitation of the solution may be accomplished by means of an ultrasonic device 46 including an ultrasonic bath 47 surrounding container 45.

The polymerized solution 44 is prepared in an equivalent oxide concentration of less than 10% but above 2% by weight. Less than a 2% concentration would probably result in impractically thin coatings. A preferred concentration is in the range of 3% to 7% by weight. The alkoxide yields a certain number of grams of metallic oxide in accordance with the above noted formulas. For example, let it be assumed that a 5% solution is desired. A quantity of metallic alkoxide is utilized so as to yield 5 grams of the metal oxide. Water and alcohol is added to bring the weight of the total solution to 100 grams. There will then be the equivalent of 5 grams of metal oxide and 100 grams of solution, or a 5% by weight solution.

Operator activation of the drive mechanism 34 in a first direction will cause bracket 36 and attached rod 40 to move downwardly until limit switch 50 is contacted to terminate the drive whereupon fiber system 42, at the end of rod 40, will be exactly immersed in solution 44.

After a short time period, for example, in the order of 1 minute, drive mechanism 34 is activated, either by an operator or by a timing device to reverse its direction so as to withdraw the fiber system from the solution at a controlled rate. If the withdrawal is too fast, an objectionably thick coating will be deposited and would be subject to splintering or chipping. Preferred withdrawal rates are in the order of 3 to 12 centimeters per minute for the solution concentrations mentioned.

Movement of the fiber system 42 after removal from solution 44 is halted at a position opposite fan 52 which is operable to provide an air flow so that the fiber system may be dried of alcohol for several minutes after removal from solution 44 so as to prevent any flame-up of this solvent during a subsequent heating step.

After sufficient drying, the drive mechanism 34 is again activated so that when bracket 36 contacts limit switch 54, upward movement of the fiber system will be terminated within a furnace 56 wherein the dried coating is then calcined, or heated, at approximately 350° to 800° C. for approximately 5 minutes to convert the coating to the pure oxide state through the liberation of organic components. If desired, further calcination steps at higher temperatures and/or for longer periods of time may be added to ensure a more complete liberation of organics and coating densification.

In addition to batch processing, as in FIG. 3, the present invention lends itself to continuous filament coating such as illustrated in FIG. 4. A supply spool 66 supplies the uncoated fiber 68 to an alkoxide solution 70 which may be contained in, and agitated by, an ultrasonic device 72.

The fiber passes around a series of rollers 74 and the coated fiber 68' after emerging from the solution 70 is dried by means of fan 76 and thereafter provided to a furnace 78 for calcination to convert the coating to a pure oxide state by liberating residual organic components.

Fiber with a pure oxide coating is wound about a take-up spool 80 which is turned by means of an operator or automatically controlled drive mechanism 82.

For some matrices and fiber combinations, a particular coating other than an oxide coating may be required for deposition on the fiber. For example, various matrix materials such as nickel or cobalt or alloys thereof in combination with an alumina or silicon carbide fiber will dictate the use of a carbide rather than an oxide coating. In accordance with the present invention, the fiber system may e coated with a particular oxide and then further processed to convert the oxide to a different chemical species. By way of example, FIG. 5 reproduces the apparatus of FIG. 4 but additionally includes a processing station 90 interposed between furnace 78 and take-up spool 80. Processing station 90 includes a furnace for heating the oxide coated wire 68' to an elevated temperature in the presence of a particular gas introduced into the station as indicated by arrow 92. For example, the introduction of gaseous ammonia in combination with temperatures in excess of 1000° C.

will convert the oxide coated fiber to a nitride coated fiber as indicated by numeral 68″. Similarly, conversion of the oxide coating to a carbide may be accomplished with the introduction of methane at a processing temperature in excess of 1200° C. Plasma assisted reactions may be required for formation of some carbides such as SiC (silicon carbide).

Figure 5:
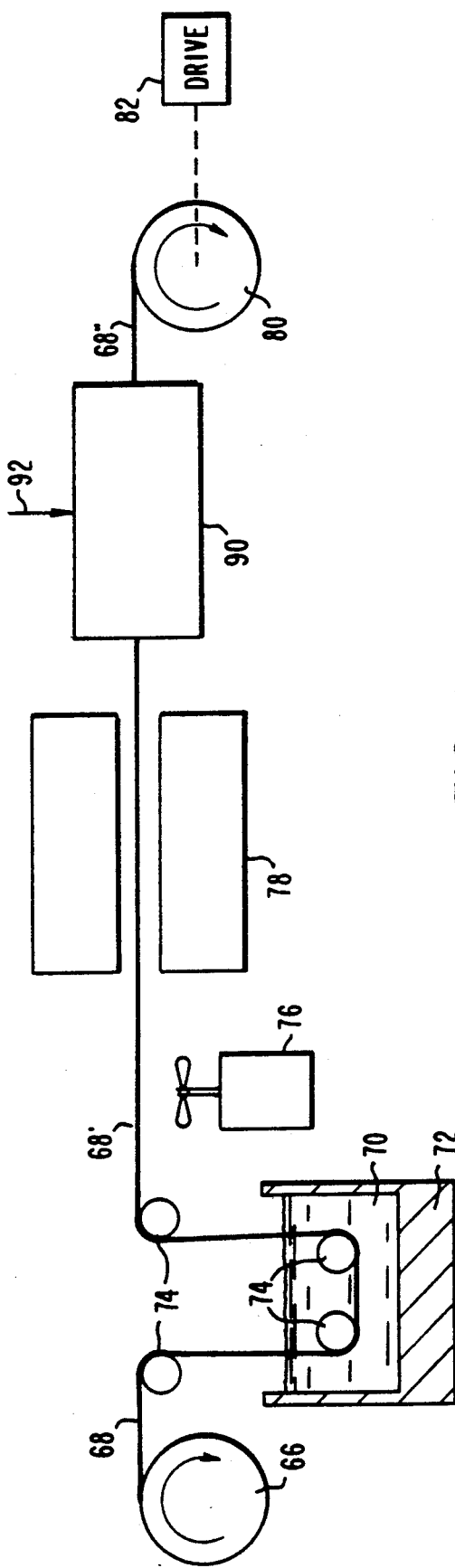
FIG. 5 is a system, as in FIG. 4, with further processing for obtaining other desired chemical coatings.

The apparatus of FIGS. 4 and 5 is operable to coat not only single fibers but yarns and cloths with a desired oxide or other coating. The apparatus may be designed so as to provide a coating of a predetermined desired thickness for a particular matrix. If it is desired to construct the apparatus to accommodate different concentrations of alkoxide solutions and different oxide thicknesses, the roller system 74 may be spacially adjustable to accommodate for different fiber immersion times within the alkoxide solution 70. Multiple dip coatings may be accomplished by introducing additional baths in series prior to entering the furnace, or by introducing additional baths and furnaces in series prior to winding. Fan 76 is representative of a drying operation which may be varied by increase or decrease of the air flow rate or by the provision of a plurality of such fans with a commensurate increase of the downstream distance of furnace 78. Furnace 78 as well as processing station 90 may each be made in sequential sections which are selectively activated or deactivated to increase or decrease the heating and/or processing time required, for a given rotation of take-up spool 80.

Subsequent to the desired coating process in accordance with the present invention, the coated fiber system in the desired form is introduced into a matrix material and processed such as by sintering and/or pressure treatment, in accordance with well-known techniques, to form a dense composite material.

Accordingly, an improved composite material may be fabricated utilizing reinforcing fibers which are given a desired coating of a precise thickness by means of a very simple and very inexpensive coating process. The process is applicable for a great variety of matrix and fiber materials. For example, ceramic-based matrices include various glasses, $Al_2O_3$ (aluminum oxide), $SiO_2$ (silicon dioxide), $3Al_2O_3.2SiO_2$ (mullite) and $2MgO.2Al_2O_3.5SiO_2$ (cordierite). Fibers for use in such matrices include C (graphite), $Al_2O_3$ (aluminum oxide), $SiO_2$ (silicon dioxide), $Si_3N_4$ (silicon nitride), $B_2O_3.Al_2O_3.SiO_2$ (boro-aluminosilicate), $3Al_2O_3.2SiO_2$ (mullite) and SiC (silicon carbide). Reaction barriers for the above fibers which may be applied with the preparation of an alkoxide solution as described herein include $3Al_2O_3.2SiO_2$ (mullite), $ZrO_2.SiO_2$ (zircon), $2MgO.2Al_2O_3.5SiO_2$ (cordierite) and $Al_2O_3$ (aluminum oxide).

Metal-based matrices include nickel, nickel alloys or nickel-based alloys, cobalt-based alloys, aluminum and aluminum alloys, and copper and copper alloys for electrical functions. Elemental based matrices include carbon and boron. Fibers for such matrices include $Al_2O_3$ (aluminum oxide), SiC (silicon carbide), $Si_3N_4$ (silicon nitride), $SiO_2$ (silicon dioxide), C (graphite), $B_2O_3.Al_2O_3.SiO_2$ (boro-alumino-silicate), $3Al_2O_3.2SiO_2$ (mullite), BN (boron nitride), TiN (titanium nitride) and AlN (aluminum nitride). Fiber coating for use in various ones of these matrices include carbides such as NbC (niobium carbide), NiC (nickel carbide) and TaC (tantalum carbide).

We claim:

1. A composite structure with embedded coated fibers made by the process of:
   A) immersing a fiber system into a polymerized solution of an oxide precursor, prepared by reaction of a metal alkoxide with a predetermined controlled amount of water in a mutual solvent so as to coat said fiber system with said oxide precursor;
   B) removing said coated fiber system from said solution after a predetermined time period;
   C) drying said removed fiber system;
   D) heating said dried fiber system to drive off any organic components and to convert the coating on said fiber system to a pure oxide state;
   E) introducing said oxide coated fiber system into a host matrix material; and
   F) processing said host matrix material, with said introduced fiber system, to form a dense solid composite material.

2. A composite structure made by the process according to claim 1 wherein:
   A) said solution has an equivalent oxide concentration of $<10\%$ and $>2\%$ by weight.

3. A composite structure made by the process according to claim 2 wherein:
   A) said concentration is in the range of 3%–7% by weight.

4. A composite structure made by the process according to claim 1 which includes the step of:
   A) further processing said dried fiber system after said heating step to convert said pure oxide coating to another chemical species.

5. A composite structure made by the process according to claim 4 wherein:
   A) said chemical species is a nitride.

6. A composite structure made by the process according to claim 4 wherein:
   A) said chemical species in a carbide.

7. A composite structure made by the process according to claim 1 wherein:
   A) said fiber system is immersed in, and removed from, said solution in a batch processing along a vertical direction of travel.

8. A composite structure made by the process according to claim 1 wherein:
   A) said fiber system is continuously fed through said solution from a supply upstream of said solution to a take up, downstream of said solution.

9. A composite structure made by the process according to claim 1 which includes the step of:
   A) agitating said solution while said fiber system is immersed therein.

10. A composite structure made by the process according to claim 9 wherein:
    A) said agitation is by ultrasonic means.

11. A composite structure made by the process according to claim 1 wherein:
    A) said processing includes the application of pressure to said host matrix material with said introduced fiber system.

12. A composite structure made by the process according to claim 1 wherein:
    A) said processing includes the application of heat to said host matrix material with said introduced fiber system.

13. A composite structure made by the process according to claim 1 wherein:
    A) said host matrix material is a ceramic-based material.

14. A composite structure made by the process according to claim 1 wherein:
    A) said host matrix material is a metal-based material.

15. A composite structure made by the process according to claim 3 wherein:
    A) said fiber system is removed from said solution at a rate of approximately 3–12 cm/min.

* * * * *